United States Patent Office 3,745,011

Patented July 10, 1973

3,745,011

NOVEL PHOTO RESIST COMPOSITION CONTAINING CYCLIC POLYCARBOXYLIC ACIDS

Donald E. Hudgin, Princeton Junction, N.J., assignor to Narland Products, Inc., New Brunswick, N.J.

No Drawing. Filed Nov. 26, 1971, Ser. No. 202,579

Int. Cl. G03c *1/00*

U.S. Cl. 96—88 11 Claims

ABSTRACT OF THE DISCLOSURE

Organic acid modifiers such as cycloaliphatic and aromatic polycarboxylic acids are incorporated in protein-based photo resists to improve the etch resistance according to the disclosed process. The organic acid modifiers are applied incorporated in the protein-based photo resist composition or as a separate coating during after development of the coated article. Preferred organic acid modifiers are trimellitic and pyromellitic acids in combination with fish glue as the protein material. The novel photo resists disclosed are useful in the process of photo chemical machining.

BACKGROUND OF THE INVENTION

This invention relates to material and process for improving the acid resistance of a protein-based photo resist.

One of the newer ways of forming precisely defined thin metal parts is by photo chemical machining, sometimes referred to as photo fabrication or chemical milling. To do this a photo sensitive coating, hereinafter referred to as a photo resist, is applied to both sides of a thin metal sheet. The metal sheet with the photo resist coating is then placed between a sandwich of exactly registered negatives, and then exposed to a high intensity ultra violet light source. Where the light penetrates the clear areas of the negative, the photo resist is changed. In the case of a negative working photo resist, the light will insolubilize the coating. The metal sheet is then washed in an appropriate solvent, which dissolves away the unexposed and still soluble areas, leaving an image on the metal. After drying and baking, this image now acts as an acid resist to prevent corrosive acid substances from attacking the underlying metal. The metal sheet is placed in an etcher, where acid is impinged against the sheet and etches away the part not protected by the acid resist.

This method has several advantages over the die stamping method of making thin metal parts. For instance, closer tolerance can be maintained, no burrs are obtained as in die stamping, and the metal is not stressed. It is possible to make parts more quickly as considerable time is required to make a proper metal die. Where a small number of parts are required, photo chemical machining is cheaper than die stamping, as the negatives required are much cheaper to make than a metal die, which requires an experienced craftsman. However, there are definite limitations to photo chemical machining. Where large numbers of parts are required, and where the other requirements are not as stringent, die stamping is lower in cost.

Recent developments in photo chemical reactions have resulted in a great number of various photo resists being commercially available. In spite of this, the rate of growth of parts made by photo chemical machining has not concomitantly increased. Part of this is due to the fact that designers and engineers are not fully acquainted with this technique of making sheet metal parts, and hence photo chemical machined parts are not designed into new equipment.

Another disadvantage is that in some cases the process has not moved out of the exotic class to reach the scale of widespread industrial applications. There are small manufacturers of photo chemical machined parts who process single sheets that range in size up to one square foot and rarely as large as two square feet. The type of photo resist coating compositions used by these relatively small manufacturers are generally quite expensive, ranging in price from $30 to $100 per gallon. Although in practice the coating thickness is very thin, of the order of 0.05–1.0 mil, the cost is multiplied as special equipment to handle flammable organic solvents is required, and the special developing solvents and stripping solutions that are required are very costly. The net result is the small manufacturer develops a pricing structure that takes into account the single sheet operation, the high cost of photo resist coating compositions and resultant processing fluids. For a manufacturer interested in a potential high volume part the cost can become uneconomical.

The problem of handling solvents and special phenolic containing solvent stripping solutions is well known to the trade, and some photo resist manufacturers have developed products that require water-based caustic solutions to wash out the image, or afterwards dissolve the image. These still suffer from the same disadvantages in that they require solvents in the photo resist and the photo resist itself is considered to be relatively expensive.

The use of this technique of making thin metal parts by a chemical etching process was developed from the photoengraving trade. In making a letterpress printing plate, an image is applied to a metal plate using the photo resist technique. The plate is then etched with acid to give a raised letterpress plate. One of the original photo resists was based on a mixture of fish glue, ammonium bichromate, and water. This evolved into a specially refined fish glue, a clear liquid somewhat like dark honey in color and viscosity, and called photoengravers glue. Because of the nature of the companies manufacturing this product, photoengraving glue was treated more like an adhesive than a photographic base. As a result, the product did have inconsistencies and its faults were attributed to the product rather than the manufacturer. When photoengraving glue was of the right quality, it was generally agreed that the product worked very well.

In the last 10 years, the manufacturing process for making photoengraving glue has improved to the point where it is very consistent, and can be used with good dependability, thus it has considerable advantage. These materials have been applied as photo resists in photo chemical machining. The cost of a gallon of photo resist made from photoengraving glue and water can be as low as $4 per gallon and is a water solution that does not require special venting or explosion proof equipment as with organic solvent based photo resists. Water is used for removing the still soluble areas of the coated part after exposure, known in the art as "developing" and a 10% solution of caustic in water will strip the photo resist after etching.

The use of photoengraving glue is of special interest to manufacturers who are set up to make metal parts by a continuous chemical machining process. In this known process a roll of metal is unwound and run through a washing process to clean the metal. The wet metal is then flow coated with the water based photoengraving glue resist and dried. The coated metal is run through printing chases where glass negatives are drawn up tight against the metal and the image exposed by an intense source of ultra-violet light. The sheet is then run through a water wash to develop the image, dried, and baked at a 500–550° F. temperature. Next the sheet passes through etchers which spray hot ferric chloride solution against the metal to etch out the open areas. Following this the resist is removed with a hot caustic solution. All of this can be in one continuous process, or it can be broken into two or three steps. Since a continuous web is processed, favorable economies are achieved. This process is described in U.S. Patent 2,762,149 to Mears and in the Feb. 8, 1971 issue of American Machinist. The largest volume production is the aperture mask or shadow mask which is a part of every color TV tube. To show the acceptance of photoengraving glue, all aperture mask manufacturers in the United States are using it in their continuous process. This is because the total cost of photoengraving glue photo resist, water for developing, and 10% caustic in water stripper, is very nominal and can represent a tremendous saving compared to the cost of the chemicals used in solvent based resists. Another advantage is in the ease of handling water based solutions, compared to solvent based solutions especially in large volume manufacturing operations.

In spite of the low cost and processing advantages, there are limitations which curtail the use of photoengraving glue as a photo resist. The bake-in or curing temperature of 500°–550° F. for up to 5 minutes is critical. Too high a temperature for too long a time will result in embrittlement and resist failure and too low a temperature results in insufficient acid resistance. Although a 48° Baumé ferric chloride is generally used, a lower Baumé will give faster etching. As the Baumé is reduced, there is more chance for resist failure. Pinholing also presents a problem, as heavier metals require longer etch time with resultant longer exposure of the photo resist to the etchant. A pinhole will result in an imperfect part, as the etchant penetrates the photoresist where the metal should be protected. Six mils metal generally can be etched satisfactorily with a normal 0.1 to 0.3 mill coating of photoengraving glue resist. For heavier metals up to 10 mils, a heavier coating up to 0.4 mil is required. Over 10 mils metal is processed only under special care and conditions. Another probelm is the normal photoengraving glue—bichromate photo resist cannot stand cycling between ferric chloride etchant and water. In single sheet operation the metal is etched, washed with water, and inspected to determine if dimensional tolerances are met. If not the part is put through the etching cycle again. Although this type of failure is true with all photo resists, it is especially a fault of a photoengraving glue-bicromate resist at the present state of the art. The photoresist will soften during the second etching cycle, and slough off leaving the entire metal exposed to the etchant. In continous chemical machining this is not the same problem as the sheet is not recycled through the etchant.

As can be readily seen, the adoption of large volume production of photochemically machined thin metal parts is dependent upon the economies of the process and the material costs. The use of water-based photoengraving glue allows for a simplified manufacturing operation, as solvents do not have to be vented nor do waste solvents have to be disposed of. The cost of the expendable materials—photo resist, developer, and stripper—is very low with a continuous process and the producer can maintain optimum economies using a photoengraving glue photo resist.

DESCRIPTION OF THE INVENTION

The present invention provides for a new and unique method of improving the acid resistance of protein-based photo resists, and especially photoengraving glue photo resists which are used by large volume continuous photo chemical machining producers. By means of the material and process disclosed herein, improvements are obtained in acid resistance which extend the potential use of protein-based photo resists in photo chemical machining. The temperature of post-bake or cure is reduced, and is no longer as critical thereby reducing serious damage to the metal part through operator error. The photo resist will withstand a lower Baumé ferric chloride for longer periods of time without failure hence decreasing the etching time required, and the acid resistance after cycling between ferric chloride and water is greatly increased. Pinholing is greatly reduced, and thinner photo resist layers withstand the acid etch for a longer period of time. With heavier photo resist coating, metals thicker than 10 mils can be etched without special care and handling, thus greatly expanding the industrial potential of photo chemical machining.

In addition to the aforementioned advantage of improved resistance to etch solutions, an additional advantage is the improvement in the "overhang" of the resist during etching. "Overhang" is the resist that remains suspended after part of the metal underneath has been dissolved. Normally the overhang, may tend to become misshapen by chipping of edges (too brittle) or sagging (too soft). This effect may be exaggerated when the metal part is returned to the etch bath one or more times. Overhangs produced by this invention are smooth and straight, showing no chipping or sagging.

In addition to the above advantages, another advantage is shown in stripping (removal of the resist after the etching step). Resists produced by this invention could be stripped from the metal in a shorter time than resists not utilizing one of the acids of this invention. This translates into economic savings by reducing the time required to carry out the stripping.

A further advantage of this invention is that lower bake temperatures can be used. Normally a temperature of 500–550° F. is required. This invention allows the production of effective resists down to a 200° F. bake temperature which results in greater flexibility of operations and reduces the number of rejected parts. Examples in this patent will show this effect.

A still further advantage of this invention is the reduction in the pinholing which results in greater productivity by reducing the percentage of rejects.

The present invention provides means for markedly improving the etch resistance of the protein-based resist. Although I do not wish to be bound by any particular theories, it is believed that a protein-based resist can be reacted with an organic acid modifier to improve the acid resistance properties thereof. By organic acid modifier is meant a member selected from cycloaliphatic polycarboxylic acids, heterocyclic polycarboxylic acids, aromatic polycarboxylic acids and aromatic sulfonic acids. Mixtures of the above organic acid modifiers may be used.

The present invention, in its composition embodiment, provides a novel photo resist coating composition consisting of a natural occurring protein, a photo-sensitizing material, a suitable aromatic, cycloparaffinic or heterocyclic carboxylic acid or an aromatic sulfonic acid and a suitable aqueous diluent.

As the protein-based material there may be used the polypeptide material derived from collagen such as fish glue, animal glue, gelatin, as well as casein and albumin—all being derived from natural sources. These materials are already well known in the art and are described in Kirk-Othmer, Encyclopedia of Chemical Technology (Second Edition) volume 10, pages 604–618, the disclosure of which is hereby incorporated by reference. The preferred protein materials are fish glues derived from fish collagen.

Conventional photo sensitizers are included in the composition of the photo resist. These materials are commonly known in the art and a list of photo sensitizers are given in Kosar, "Light Sensitive Systems," John Wiley & Sons, New York, N.Y., pages 52 and 160 to 187, the disclosure of which is hereby incorporated by reference. Ammonium bichromate is the preferred sensitizer.

It is also necessary to include a substantial quantity of water in the formulation, first to dilute the rather substantial amount of glue, then to dissolve the other ingredients.

The organic acid modifiers are usually present in small quantities, at least in an amount of about 0.01% based on the weight of the dry protein, although they may be present in concentrations as high as the solubility of the acid in the aqueous protein solution. For the sake of economy and correct practice, an amount of 1 to 25 weight percent is preferred. The acid may be incorporated in the aqueous protein solution or incorporated by dipping a light-hardened protein coated plate into a solution of the acid.

Illustrative but not limiting examples of the types of organic acid modifiers with which this invention is concerned are cycloaliphatic polycarboxylic acids, heterocyclic polycarboxylic acids, aromatic polycarboxylic acids and aromatic sulfonic acids. As examples of cycloaliphatic polycarboxylic acid having 3 to 7 carbon atoms in the cyclic ring there may be cyclobutane, cyclopentane or cyclohexane and derivatives thereof containing two or more carboxyl groups. Preferred are cycloalkane polycarboxylic acids having 4 to 6 carbon atoms in the cycloalkane and having 2 to 4 carboxylic acid groups. Examples are 1,1-cyclobutane dicarboxylic acid, 1,2,3,4-cyclopentane tetracarboxylic acid, 1,2-cyclohexane dicarboxylic acid and 1,2,3,4-cycloheptane tetracarboxylic acid.

The heterocyclic polycarboxylic acids may be derivatives of a heterocyclic compound such as pyridine, piperazine, tetrahydrofuran and thiophene such as 2,6-pyridine dicarboxylic acid, 3,5-piperazine dicarboxylic acid, 2,6-thiophene dicarboxylic acid, 3,4-tetrahydrofuran dicarboxylic acid and 2,5-tetrahydrofuran dicarboxylic acid.

The aromatic polycarboxylic acids are those having carboxyls attached to an aromatic ring; of course more than one aromatic ring may be present, such as those acids based on naphthalene, benzophenone, diphenylmethane nuclei and the like. Among the acids I have found to be particularly effective are 1,2,4,5-benzene tetracarboxylic acid (pyromellitic acid), 3,4,3′,4′-benzophenone tetracarboxylic acid (BPTA); 1,2,4-benzene tricarboxylic acid (trimellitic acid); 1,2,3,4,5,6-benzene hexacarboxylic acid (mellitic acid) and 1,2,3-benzene tricarboxylic acid (hemimellitic acid). The most preferred aromatic acids according to the present invention are trimellitic and pyromellitic.

The aromatic sulfonic acids that are useful include p-toluene sulfonic acid, 2-naphthalene sulfonic acid, naphthalene 1,8-disulfonic acid, benzene sulfonic acid and 1,3-benzene disulfonic acid.

Other useful acids will be those having certain substituted groups on the aromatic ring. For example, any one or all of the three remaining hydrogens on trimellitic acid can be substituted with a lower alkyl group having up to 6 carbon atoms or a halogen such as fluorine, chlorine or bromine with the resulting acid still being an effective reactant in producing a more resistant resist. When the acidic materials are mixed with a coating composition a preferred formulation according to the invention contains about 10 to 15 parts of dry protein-based glue, 0.5 to 5 parts photosensitizer, 0.1 to 5 parts of acidic material and a sufficient quantity of water to dissolve the glue and achieve the desired viscosity.

In the process aspect of my invention there is provided a method of applying according to known techniques a photo resist coating (consisting essentially of a protein based glue, photo sensitizer and water) to the metal to be photo chemically milled, exposing the thus coated metal to a strong source of ultra-violet light in conjunction with either one negative for single side coating or two glass negatives in exact register for two side coating, as hereinbefore described, thereby insolubilizing the exposed portions of the photo resist and washing the unexposed, soluble photo resist coated metal in a room temperature water wash. Thereafter the remaining photo resist is contacted with a solution of a polycarboxylic acid of the type previously described and then the metal piece is etched with ferric chloride in the known manner. Thus in this process embodiment of my invention it is not necessary that the modifying organic acid be included in the photosensitive glue coating. Rather it is later applied to the developed metal piece as a separate step, preferably as an aqueous solution. The amount of acidic modifying material applied varies with the operational conditions but at least 0.01 weight percent is generally present, preferably at least 0.125% weight percent or 0.25 weight percent and more preferably an amount of from 1 to about 25 weight percent of the solution in which it is applied is used. The temperature at which the organic acid modifier is applied is not critical; for convenience ambient temperatures are used. It will be appreciated that only minor modifications are necessary in existing photo resist chemical machining operations to include the organic acid modification step as herein described. As will be appreciated, the organic acid modifier may be applied as a dip, spray or other means generally known in the art.

As the ultra-violet light source there is used arc lamps, pulsed Xenon lamps and mercury vapor lamps, although any source of ultra-violet light can be used. A typical photo exposure can be carried out using Model DMVL Exposure Unit, manufactured by Colight, Inc., Minneapolis, Minn. 55401, using an exposure time from 2 to 4 minutes.

It will be appreciated that normal etching time varies with several factors including type and thickness of the metal, the type and concentration of the etchant and temperature of the etchant.

The following examples are representative of embodiments of the present invention which is not limited thereto. Unless otherwise indicated, all parts and percentages are by weight.

Example 1

In a test for surface failure, two stainless steel plates 5 mils thick were both coated in a whirler coater using a solution containing the following ingredients in parts by weight:

| | Parts |
|---|---|
| Fish glue water solution (45% solids) | 50 |
| Ammonium bichromate | 5 |
| Water | 125 |

The dried coating on the plates was approximately 0.2 mil thick. The coated plates were then exposed to ultraviolet light in the equipment previously described for 4 minutes, after which they were washed with room temperature tap water for 1 minute. Plate 1, while still wet, was dipped in a 1% solution of trimellicic acid for 15 seconds, rinsed under the tap for 2 seconds and dried. Another coated plate, Plate A, was treated similarly, with the exception it was not dipped in the trimellitic acid solution and therefore served as a control. The plates were then heated at 525° F. for 10 minutes after which they were subjected to an etch solution (40° Bé. $FeCl_3$) spray at 120° F. until they failed; failure was indicated when there was an obvious break in the resist coating. The plates were visually inspected at 5 minute intervals with the following results observed, the time to failure being the elapsed time from initiation of the application of the etch solution to an obvious break in the resist coating.

| Plates: | Time to failure, minutes |
|---|---|
| 1 (dipped in trimellitic acid solution) | >105 |
| A (control) | 25 |

Although in the preparation of the resist, as indicated above, a 2 second water rinse was used, it has been found that this step is not necessary. An improved procedure is to omit the rinse step after dipping in the acid solution and then dry immediately by air jet. It is believed this procedure eliminated any residual acid that may have been deposited on the exposed metal surface.

Example 2

A stainless steel plate 5 mils thick was coated in the same manner as Example 1 with the following solution in a whirler coater:

FORMULATION I

| | Parts |
|---|---|
| Fish glue water solution (45% solids) | 50 |
| Ammonium bichromate | 5 |
| Water | 125 |

The plate coated with Formulation I was designated as the control and was labeled B.

A second stainless steel plate also 5 mils thick was coated in the same manner with a solution similar to the V plate coating but including pyromellitic acid. The following solution was applied in a whirler coater:

FORMULATION II

| | Parts |
|---|---|
| Fish glue water solution (45% solids) | 50 |
| Ammonium bichromate | 5 |
| Water | 125 |
| Pyromellitic acid | 0.23 |

The plate coated with Formulation II was labeled 2.

The plates were heated at 525° for 10 minutes. Both plates were then subjected to an etch solution as described in Example 1 with the following results:

| Plates: | Time to failure minutes |
|---|---|
| B (control) | 85 |
| 2 | 85 |

Examples 3 to 13

Following the procedure and the base composition of Example 1 in which the control failed in 25 minutes, the effectiveness of various other polycarboxylic acids are as follows:

| Example | Acid (percent solution in water, approximate) | Time to failure, minutes |
|---|---|---|
| 3 | Pyromellitic acid (1%) | 85 |
| 4 | Trimesic acid (0.5%) | >65 |
| 5 | Phthalic acid (<0.5%)[1] | 40 |
| 6 | Hemimellitic acid (2%) | 70 |
| 7 | Mellitic acid (2%) | 60 |
| 8 | Pyridine 2,6-dicarboxylic acid [1] (<0.5%) | 70 |
| 9 | p-Toluenesulfonic acid (2%) | 80 |
| 10 | 1,2,3,4-cyclopentane tetracarboxylic acid (5%) | 80 |
| 11 | 2-naphthalene sulfonic acid (16%) | 75 |
| 12 | Vanderbilt's PD230 (1%)[2] | 75 |
| 13 | 1,3-benzene disulfonic acid (16%) | 50 |
| 14 | Benzene pentacarboxylic acid (2%) | >75 |

[1] Acid is poorly soluble in water.
[2] 4,4'-(2-acetoxy-1,3-glyceryl)bis-anhydro trimellitate.

Camparative examples C–F

Using the same procedure and base composition as in Example 1, in which the control failed in 25 minutes, other types of acids were found to be relatively ineffective as shown by the following examples; the listed acids being used in place of trimellitic acid:

| Example | Acid (percent solution in water, approximate) | Time to failure, minutes |
|---|---|---|
| C | Ethane sulfonic acid (8%) | 10 |
| D | Maleic acid (10%) | 25 |
| E | Dodecenyl succinic acid (1%) | 25 |
| F | Copolymer of methyl vinyl ether and maleic acid derived from GAF Gantrez 119 [1] (5%). | 25 |

[1] This is commercially available as GANTREZ 119 sold by the GAF Corporation, New York, N.Y.

Examples 15

Following the procedure and the base composition of Example 1 except using lower bake temperatures, the following data indicate the effectiveness of the lower bake temperature:

| Bake temperature | Treated with trimellitic acid solution | Time to failure, minutes |
|---|---|---|
| 350° F. | Yes | >75 |
| 350° F. (control) | No | 30 |
| 250° F. | Yes | >75 |
| 250° F. (control) | No | 5 |

Example 16

Following the procedure of Example 1 but substituting a borex-caseinate for fish glue and using a bake temperature of 400° F., the following results were obtained:

| Treated with trimellitic acid solution: | Time to failure, minutes |
|---|---|
| Yes | >65 |
| No (Control) | 35 |

Examples 17

Following the procedure of Example 1 except using a highly hydrolysed lime-gelatin in place of fish glue and using a bake temperature of 400° F., the following results were obtained:

| Treated with trimellitic acid solution: | Time to failure, minutes |
|---|---|
| Yes | 50 |
| No (Control) | 35 |

Example 18

Following the procedure of Example 1 except using a bake temperature of 200° F. and varying the concentration of the trimellitic acid solution, the following results were obtained:

| Conc. of trimellitic acid solution, percent: | Time to failure, minutes |
|---|---|
| 2.0 | 40 |
| 1.0 | 40 |
| 0.5 | 30 |
| 0.25 | 30 |
| 0.125 | 20 |
| 0.0 | 10 |

This shows very clearly that the concentration of the dip solution is important in obtaining the desired etch resistance.

Example 19

Following the procedure of Example 1, except using a bake temperature of 300° F. and varying the time of dip, the following results were obtained:

| Time of dip in the trimellitic acid solution, seconds: | Time to failure, minutes |
|---|---|
| 15 | >75 |
| 5 | 70 |
| 0 (Control) | 10 |

This shows that the time of dip is important in obtaining the desired etch resistance.

I claim:

1. An improved photoresist composition comprising an aqueous solution of a naturally occurring protein material and an organic acid modifying agent selected from cycloaliphatic polycarboxylic acid, heterocyclic polycarboxylic acid, aromatic polycarboxylic acid and aromatic sulfonic acid and a photosensitive material that on exposure to ultra-violet light, renders the composition substantially insoluble to water.

2. The composition as claimed in claim 1 wherein the protein material is fish glue.

3. The composition as claimed in claim 1 wherein the organic acid modifying agent is present in an amount of from about 0.01 to 25.0 weight percent based on the protein material.

4. The composition as claimed in claim 3 wherein the organic acid modifying agent is present in an amount of from 1 to 25 weight percent based on the protein material.

5. The composition as claimed in claim 1 wherein the organic acid modifying agent is a cycloalkane polycarboxylic acid having 4 to 6 carbon atoms in the cycloalkane and 2–4 carboxyl groups.

6. The composition as claimed in claim 5 wherein the cycloalkane polycarboxylic acid is selected from 1,1-cyclo butane dicarboxylic acid, 1,2,3,4-cyclopentane tetracarboxylic acid, 1,2-cyclohexane dicarboxylic acid and 1,2,3,4-cycloheptane tetracarboxylic acid.

7. The composition as claimed in claim 1 wherein the heterocyclic polycarboxylic acid is a derivative of pyridine, piperazine, tetrahydrofuran or thiophene having from 2–4 carboxyl groups.

8. The composition as claimed in claim 7 wherein the heterocyclic polycarboxylic acid is selected from 2,6-pyridine dicarboxylic acid, 3,5-pyridine dicarboxylic acid, 2,6-piperazine dicarboxylic acid, 3,5-piperazine dicarboxylic acid, 2,6-thiophene dicarboxylic acid and 3,4-tetrahydrofuran dicarboxylic acid.

9. The composition as claimed in claim 1 wherein the aromatic polycarboxylic acid contains from 6 to 14 carbon atoms and has from 2 to 7 carboxyl groups attached to the aromatic ring.

10. The composition as claimed in claim 9 wherein the aromatic polycarboxylic acid is selected from pyromellitic acid, trimellitic acid, melletic acid, hemimellitic acid and 3,4,3',4'-benzophenone tetracarboxylic acid.

11. The composition of claim 1 wherein the protein material is fish glue and the organic acid modifying agent is trimellitic acid.

References Cited

UNITED STATES PATENTS

| | | | |
|---|---|---|---|
| 3,677,760 | 7/1972 | Iwano et al. | 260—117 |
| 3,583,969 | 6/1971 | Klinger et al. | 260—117 |
| 3,579,374 | 5/1971 | Dennilauler et al. | 260—117 |
| 3,118,766 | 1/1964 | Roth | 260—117 |
| 3,370,969 | 2/1968 | Powell et al. | 106—124 |
| 3,321,309 | 5/1967 | Reichel | 96—36 |
| 3,634,078 | 1/1972 | Uhlig | 96—88 |
| 3,615,952 | 10/1971 | Davidson | 96—88 |

NORMAN G. TORCHIN, Primary Examiner

E. C. KIMLIN, Assistant Examiner

U.S. Cl. X.R.

96—36, 93; 106—124; 260—117

UNITED STATES PATENT OFFICE

CERTIFICATE OF CORRECTION

Patent No. 3,745,011 Dated July 10, 1973

Inventor(s) Donald E. Hudgin

It is certified that error appears in the above-identified patent and that said Letters Patent are hereby corrected as shown below:

Column 1, line 5, change "Narland" to --Norland--.

Column 3, line 35, change "probelm" to --problem--.

Column 6, line 50, change "trimellicid" to --trimellitic-- .

Column 7, line 15, change "V" to --B--.

Column 7, line 30, change "85" to --25--.

Column 8, line 13, change "borex" to --borax--.

Column 10, claim 10, line 3, change "melletic acid" to --mellitic acid--.

Signed and sealed this 27th day of November 1973.

(SEAL)
Attest:

EDWARD M.FLETCHER,JR.
Attesting Officer

RENE D. TEGTMEYER
Acting Commissioner of Patents